(12) United States Patent
Khalil

(10) Patent No.: US 9,906,516 B2
(45) Date of Patent: Feb. 27, 2018

(54) SECURITY SYSTEM FOR PREVENTING FURTHER ACCESS TO A SERVICE AFTER INITIAL ACCESS TO THE SERVICE HAS BEEN PERMITTED

(71) Applicant: Verizon Patent and Licensing Inc., Arlington, VA (US)

(72) Inventor: Manah M. Khalil, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 133 days.

(21) Appl. No.: 14/813,912

(22) Filed: Jul. 30, 2015

(65) Prior Publication Data
US 2017/0034155 A1  Feb. 2, 2017

(51) Int. Cl.
H04L 29/06 (2006.01)

(52) U.S. Cl.
CPC ........ H04L 63/0823 (2013.01); H04L 63/102 (2013.01)

(58) Field of Classification Search
CPC .......................... H04L 63/0823; H04L 63/102
USPC .......................................................... 726/7
See application file for complete search history.

(56) References Cited

U.S. PATENT DOCUMENTS

| | | | | |
|---|---|---|---|---|
| 2013/0040604 A1* | 2/2013 | Sprigg | ..................... | H04L 51/12 455/410 |
| 2013/0318249 A1* | 11/2013 | McDonough | ........... | H04L 67/02 709/228 |
| 2014/0109186 A1* | 4/2014 | Oikonomidis | ...... | G06F 21/6218 726/4 |
| 2014/0242941 A1* | 8/2014 | Zhang | ..................... | H04W 4/24 455/406 |
| 2014/0282981 A1* | 9/2014 | Satpathy | ............... | H04L 63/083 726/8 |
| 2014/0324960 A1* | 10/2014 | Pattan | .................. | H04N 21/242 709/203 |
| 2015/0121496 A1* | 4/2015 | Caldeira De Andrada | ................. | H04L 63/08 726/7 |
| 2015/0200925 A1* | 7/2015 | Lagerstedt | ............ | H04L 63/062 726/6 |
| 2016/0352729 A1* | 12/2016 | Malik | ................. | H04L 63/0876 726/1 |

OTHER PUBLICATIONS

U.S. Appl. No. 14/208,159, filed Mar. 2014, Khalil et al.
(Continued)

Primary Examiner — Haresh N Patel

(57) ABSTRACT

A device may receive information associated with a user request to access a service using a first device. The information may include a user credential. The device may identify a second device associated with the user credential. The device may provide a notification, associated with the user request to access the service, to the second device, and may receive a response from the second device. The response may indicate to permit access to the service. The device may provide an instruction to permit the first device to access the service. The device may provide information that identifies services for which access has been permitted for the user credential. The device may receive an indication to prevent further access, for the user credential, to at least one service. The device may provide an instruction to prevent further access to the at least one service for the user credential.

20 Claims, 13 Drawing Sheets

(56) References Cited

OTHER PUBLICATIONS

U.S. Appl. No. 14/278,710, filed May 2014, Khalil et al.
Netflix, "Someone is using my Netflix account without my permission," https://help.netflix.com/en/node/18, Jan. 23, 2014, 1 page.

* cited by examiner

SECURITY SYSTEM FOR PREVENTING FURTHER ACCESS TO A SERVICE AFTER INITIAL ACCESS TO THE SERVICE HAS BEEN PERMITTED

BACKGROUND

Passwords may be used for user authentication to prove an identity and/or to gain access to a protected resource. For example, a username and password may be used by a user during a login process that controls access to protected computing devices, operating systems, applications (e.g., email, web sites, etc.), databases, networks, etc.

DETAILED DESCRIPTION OF PREFERRED EMBODIMENTS

The following detailed description of example implementations refers to the accompanying drawings. The same reference numbers in different drawings may identify the same or similar elements.

User authentication may be achieved by receiving a user credential via a first device and authenticating the user via a second device. For example, a user may use a first device (e.g., a client device) to attempt to access a service using a user credential (e.g., via a login attempt). An authentication device may identify a second device (e.g., a user device) based on the user credential, and may send an access notification to the second device to authenticate the user. For example, the authentication device may send an access notification to a user's mobile phone, and may use a response to the access notification to authenticate the user. In some cases, a user may accidentally approve access for a malicious user (e.g., a hacker) using the access notification. Implementations described herein provide techniques for preventing further access to a service after initial access to the service has been permitted, thereby increasing security.

Figure 1:
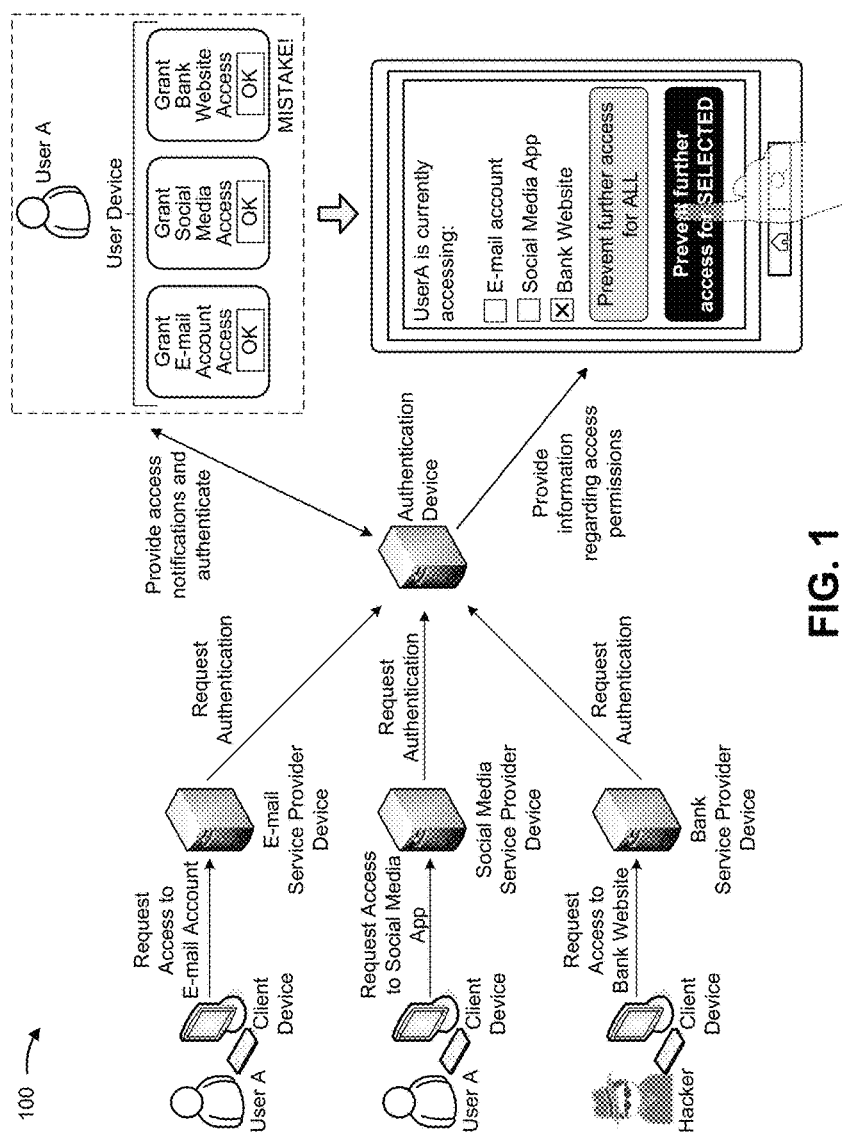
FIG. 1 is a diagram of an overview of an example implementation described herein.

FIG. 1 is a diagram of an overview of an example implementation 100 described herein. As shown in FIG. 1, a user, shown as User A, may use a client device to request access to various services, such as an email account and a social media application. As further shown, a hacker may impersonate User A by using a credential of User A to request access to a service, such as a bank website (e.g., to attempt to gain access to User A's bank account information). As shown, the requests may be sent to service provider devices (e.g., servers) associated with service providers that provide the various services to which access has been requested. As further shown, the service provider devices may request authentication by an authentication device (e.g., a server).

As further shown in FIG. 1, the authentication device may provide access notifications, for the requests to access the services, to a user device associated with User A. For example, the authentication device may provide the access notifications to a mobile phone of User A. User A may interact with the access notifications to approve or deny access to the services by the client devices. For example, User A may interact with access notifications (e.g., using the user device) to permit User A to access the email account and the social media application. Further, User A may interact with an access notification to accidentally approve access for the hacker to the bank website using User A's credentials. In this case, User A may want to deny further access to the hacker after accidentally approving this initial access.

To prevent further access by the hacker to the bank website using User A's credentials, the authentication device may provide information that identifies services currently being accessed using User A's credentials (e.g., based on a request from the user device). In this case, the services are the email account, the social media application, and the bank website. The user may interact with the user device to indicate to deny (e.g., prevent) further access to one or more of the services (e.g., all of the services, selected services, etc.). The authentication device may receive, from the user device, an indication of a service for which further access is to be prevented, and may provide an instruction to the appropriate service provider device to prevent further access. In this case, the hacker may be prevented from obtaining sensitive bank account information after an initial login to the bank website. In this way, the authentication device may increase security of services provided to a user.

Figure 2:
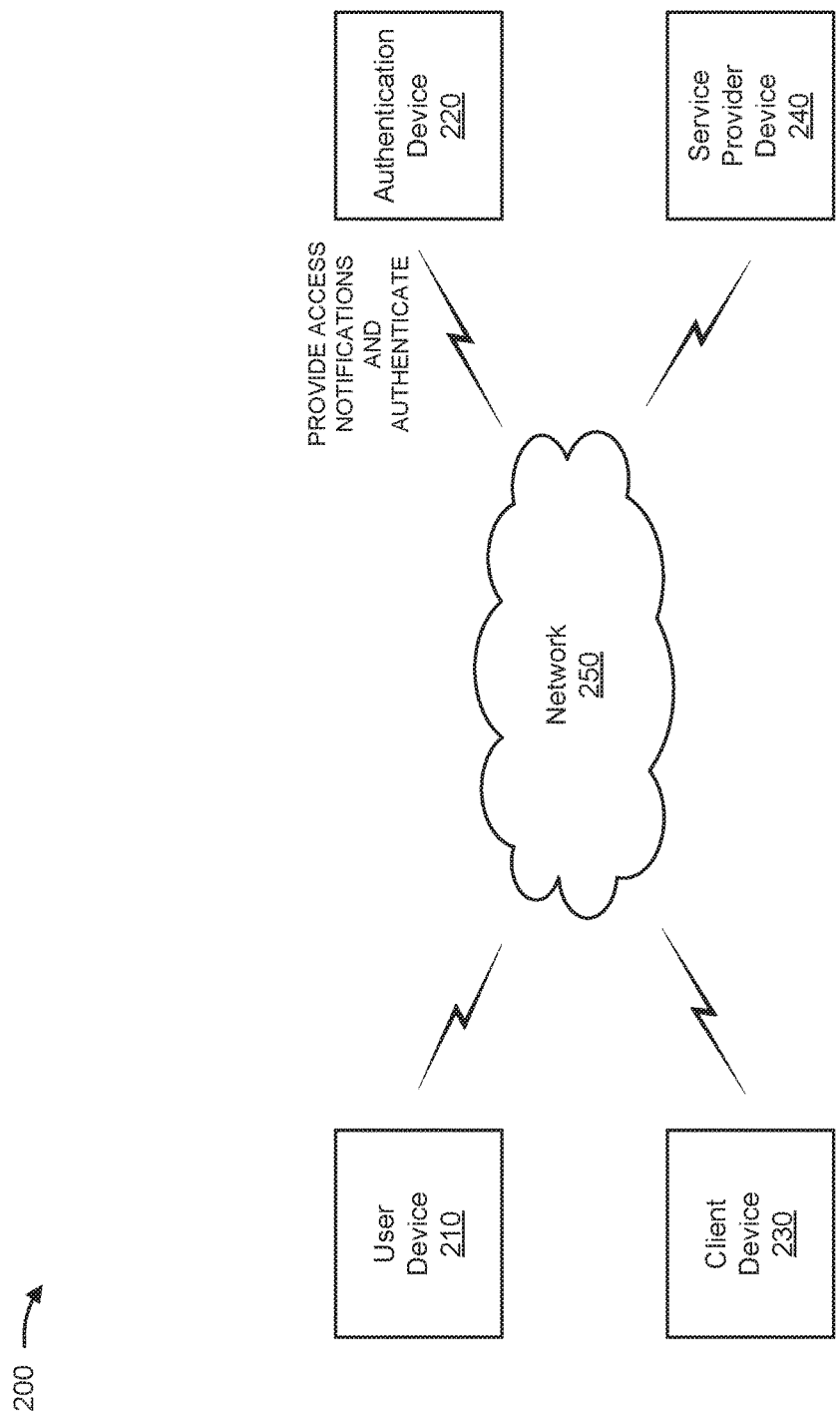
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an authentication device 220, a client device 230, a service provider device 240, and a network 250. Devices of environment 200 may interconnect via wired connections, wireless connections, or a combination of wired and wireless connections.

User device 210 may include one or more devices capable of receiving, generating, storing, processing, and/or providing information associated with accessing a service (e.g., an access notification, an access response, information associated with approving or denying access to a service, etc.). For example, user device 210 may include a mobile phone (e.g., a smart phone, a radiotelephone, etc.), a tablet computer, a handheld computer, a laptop computer, or a similar device. In some implementations, user device 210 may receive an access notification from authentication device 220 when a credential of a user, associated with user device 210, is used by client device 230 to attempt to access a service provided via service provider device 240. Additionally, or alternatively, the user may interact with user device 210 to deny (e.g., prevent) further access to the service.

Authentication device 220 may include one or more devices capable of receiving, generating, storing, processing, and/or providing information associated with managing access to a service (e.g., by a user and/or a device, such as user device 210, client device 230, etc.). For example, authentication device 220 may include a computing device, such as a server (e.g., an authentication server, a firewall, etc.), a network device, or a similar device. Authentication device 220 may authenticate a user, associated with user device 210, when the user's credentials are used by client device 230 to attempt to access a service provided via service provider device 240. For example, authentication device 220 may provide an access notification to user device 210, and may receive, from user device 210, a response associated with the access notification to approve or deny access to the service. Additionally, or alternatively, authentication device 220 may communicate with user device 210 to prevent further access to a service after initial access to the service has been permitted.

Client device 230 may include a device capable of receiving, generating, storing, processing, and/or providing information associated with accessing a service. For example, client device 230 may include a computing device, such as a desktop computer, a laptop computer, a tablet computer, a handheld computer, a phone (e.g., a mobile phone, a smart phone, a radiotelephone, a wireline phone, etc.), or a similar device. Additionally, or alternatively, client device 230 may include an automated teller machine (ATM), a card reader (e.g., a credit card reader), a set-top box, a device that controls whether a vehicle (e.g., a car) may be operated, a device that controls access to a building (e.g., a security system), a gaming device, a kiosk device, or another device that provides an interface for a user to access a service. A user may use client device 230 to attempt to access a service, provided by service provider device 240. Service provider device 240 may request authentication of the user from authentication device 220, which may provide an instruction to approve or deny (e.g., permit or prevent) initial access and/or further access to the service.

Service provider device 240 may include one or more devices capable of receiving, generating, storing, processing, and/or providing information associated with providing access to a service (e.g., to client device 230). For example, service provider device 240 may include a computing device, such as a server (e.g., a content server, a web server, a host server, a database server, a voice portal server, a payment processing server, a credit card processing server, etc.), a security device (e.g., a firewall, a gateway, an access point, etc.), an interactive voice recognition device, or a similar device. When a user uses client device 230 to attempt to access a service provided by service provider device 240, service provider device 240 may request authentication of the user by authentication device 220. Service provider device 240 may permit or prevent initial access and/or further access by client device 230 to a service based on information received from authentication device 220.

In some implementations, service provider device 240 and authentication device 220 may be associated with (e.g., owned by, licensed for use by, etc.) a same entity (e.g., a network operator, a third party service provider, etc.). In some implementations, service provider device 240 and authentication device 220 may be associated with different entities.

Network 250 may include one or more wired and/or wireless networks. For example, network 250 may include a cellular network (e.g. a code division multiple access (CDMA) network, a long term evolution (LTE) network, etc.), a public land mobile network (PLMN), a local area network (LAN), a wide area network (WAN), a metropolitan area network (MAN), a telephone network (e.g., the Public Switched Telephone Network (PSTN)), a near field communication (NFC) network, an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
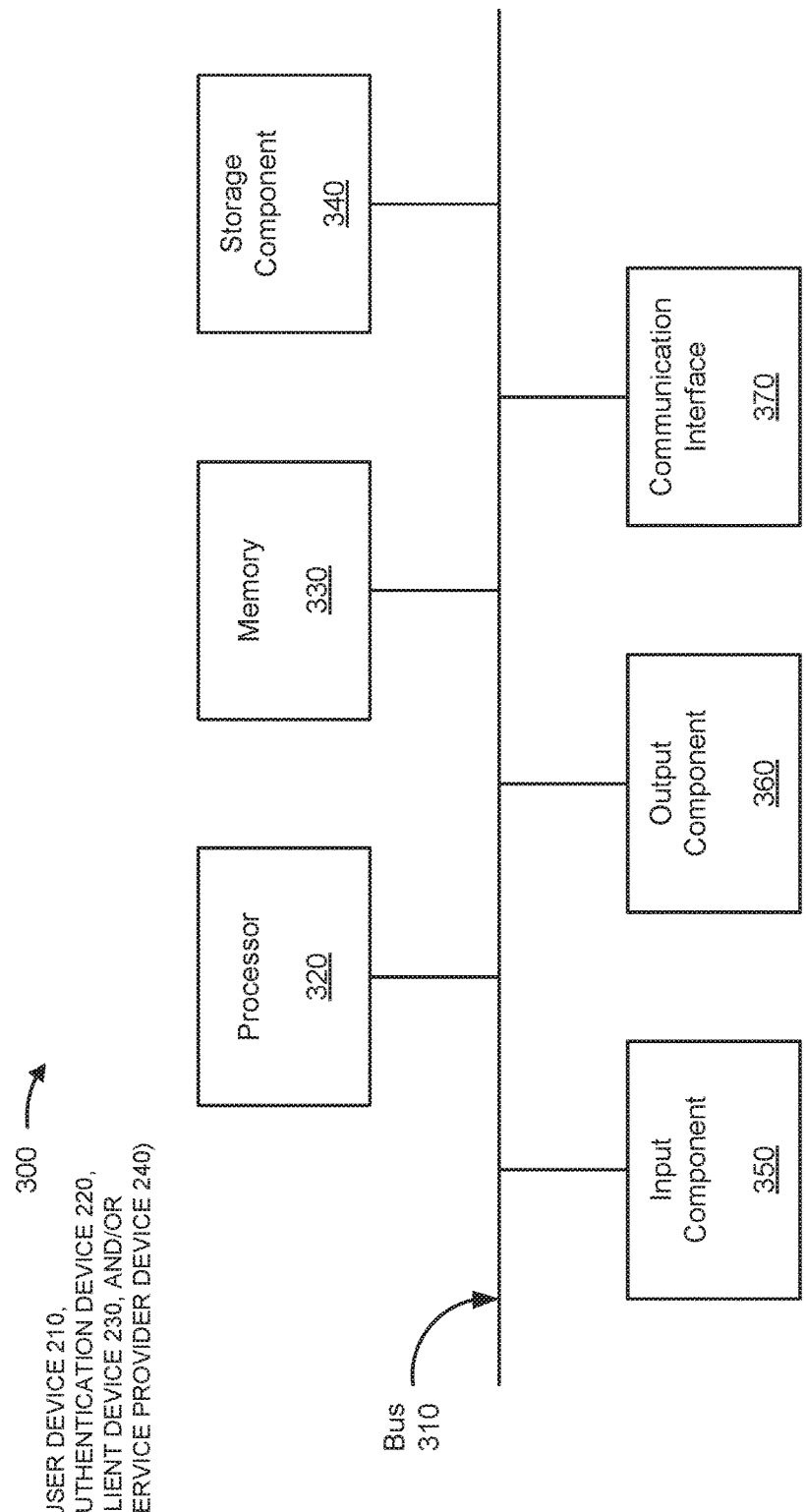
FIG. 3 is a diagram of example components of one or more devices of FIG. 2.

FIG. 3 is a diagram of example components of a device 300. Device 300 may correspond to user device 210, authentication device 220, client device 230, and/or service provider device 240. In some implementations, user device 210, authentication device 220, client device 230, and/or service provider device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. In some implementations, processor 320 may include one or more processors. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
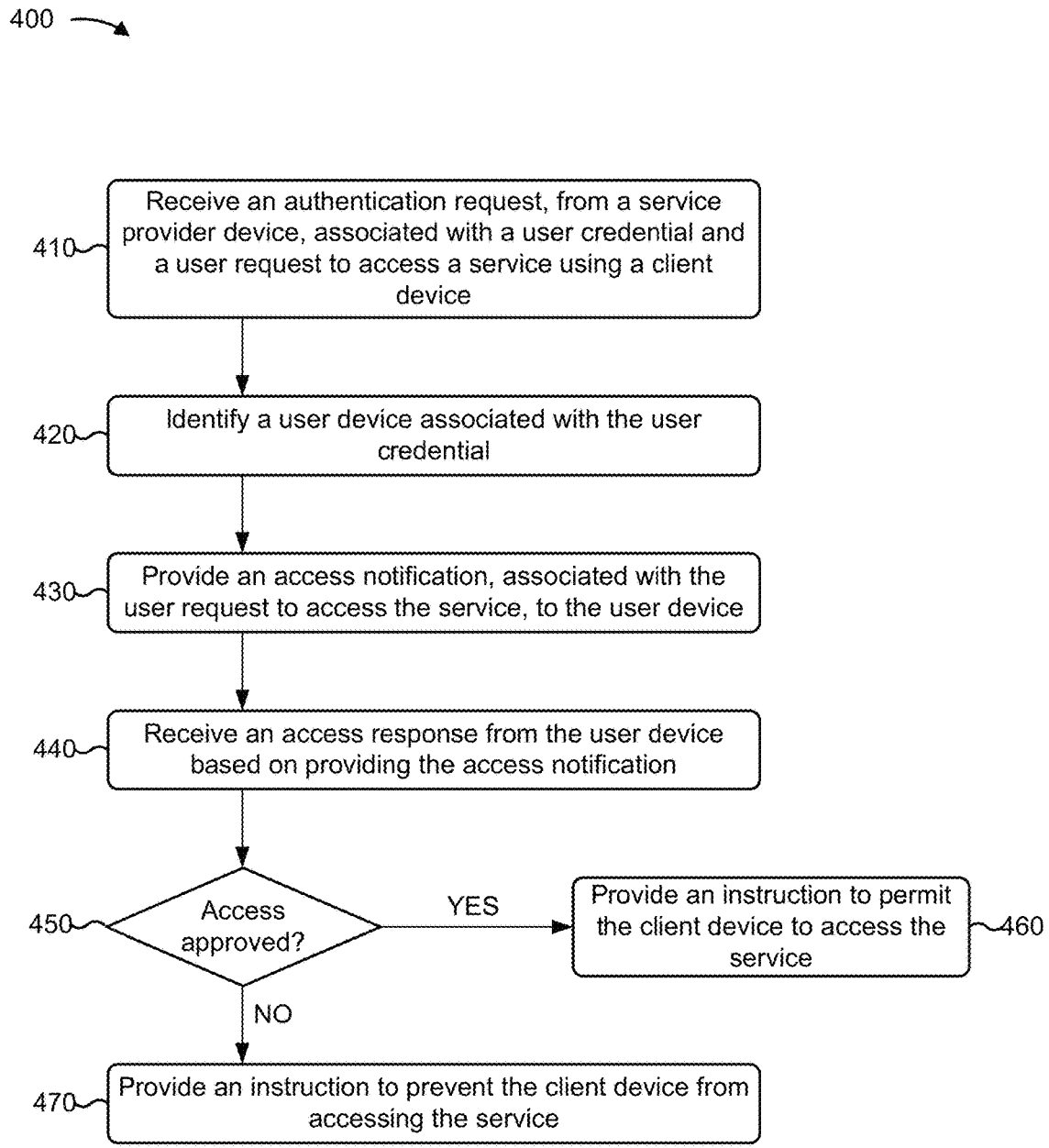
FIG. 4 is a flow chart of an example process for using an access notification to permit or prevent access to a service.

FIG. 4 is a flow chart of an example process 400 for using an access notification to permit or prevent access to a service. In some implementations, one or more process blocks of FIG. 4 may be performed by authentication device 220. In some implementations, one or more process blocks of FIG. 4 may be performed by another device or a group of devices separate from or including authentication device 220, such as user device 210, client device 230, and/or service provider device 240.

As shown in FIG. 4, process 400 may include receiving an authentication request, from a service provider device, associated with a user credential and a user request to access a service using a client device (block 410). For example, authentication device 220 may receive an authentication request from service provider device 240. The authentication request may be generated and sent by service provider device 240 when a user attempts to access a service provided by service provider device 240. For example, a user may interact with client device 230 to request access to a service provided by service provider device 240, which may cause service provider device 240 to generate and provide the authentication request to authentication device 220. In some implementations, service provider device 240 may register with authentication device 220 to permit usage of authentication device 220 for authentication of users and/or user credentials.

The authentication request may include information relating to an access request, which may request access to the service by the user. For example, the user may input a user credential (e.g., a username, an email address, a global user credential, a password, etc.) via client device 230, and service provider device 240 may include the user credential in the authentication request. Additionally, or alternatively, the authentication request may identify a date on which the access request was made, a time at which the access request was made, a website via which the access request was made, an identity of the service provider, a type of access request (e.g., a login request, a purchase request, etc.), a device identifier of service provider device 240 providing the authentication request, or the like. In some implementations, authentication device 220 may validate the authentication request.

As further shown in FIG. 4, process 400 may include identifying a user device associated with the user credential (block 420). For example, authentication device 220 may determine a user device identifier (e.g., a mobile directory number (MDN), an international mobile subscriber identifier (IMSI), etc.) that identifies user device 210 associated with the user credential used to attempt to access the service. In some implementations, authentication device 220 may determine the user device identifier using stored user registration information. For example, the stored registration information may include information that identifies a correspondence between a user credential and the user device identifier. Authentication device 220 may identify a user credential included in the authentication request, and may determine a user device identifier that corresponds to the user credential. The user device identifier may identify a user device 210 that is different from client device 230 used to attempt to access the service.

As further shown in FIG. 4, process 400 may include providing an access notification, associated with the user request to access the service, to the user device (block 430). For example, authentication device 220 may generate an access notification, and may provide the access notification to user device 210. The access notification may indicate an attempt to access the service, and may provide an input mechanism that permits a user of user device 210 to approve or deny the access. In this way, if the user is attempting to access the service, then the user may provide input to approve the access, and the access may be permitted. However, if another user (e.g., a hacker) is attempting to access the service, then the user may provide input to deny the access, and the access may be prevented.

In some implementations, a user and/or a service provider may customize the access notification by inputting user preferences and/or service provider preferences (e.g., provided to authentication device 220), and authentication device 220 may generate the access notification based on the user preferences and/or the service provider preferences. As an example, the access notification may identify the service, may identify a service provider that provides the service, may identify a date and/or a time that access was requested to the service, may identify a user credential used to attempt to access the service, may identify a location (e.g., a geographic location) from which access was requested, may identify a device (e.g., client device 230) from which access was requested, etc.

The access notification may include a security feature, in some implementations. For example, the access notification may include a security image, previously specified by the user, to be provided for display via user device 210. As another example, the access notification may include an input mechanism that requires the user to input a PIN or some other input in order to approve access. In this way, security of the service may be increased.

As further shown in FIG. 4, process 400 may include receiving an access response from the user device based on providing the access notification (block 440), and determining whether access to the service has been approved based on the access response (block 450). For example, authentication device 220 may receive an access response from user device 210. The access response may indicate whether to approve (e.g., permit) access to the service or to deny (e.g., prevent) access to the service. For example, an access notification, provided for display via user device 210, may include an input mechanism that permits a user to provide input indicating whether to approve access (e.g., via an approve button, a positive response to a text message, etc.) or deny access (e.g., via a deny button, a negative response to a text message, etc.). In some implementations, authentication device 220 may receive a PIN, an answer to a challenge question, etc., from user device 210, and may compare this information to stored information to determine whether to permit access to the service.

A user may interact with the input mechanism to approve or deny access, and user device 210 may provide the access response, indicating whether to approve or deny access based on the user interaction, to authentication device 220. Authentication device 220 may determine whether to permit (e.g., approve) or prevent (e.g., deny) access based on information included in the access response. In some implementations, authentication device 220 may not receive an access response (e.g., if the user does not approve or deny access within a threshold amount of time). In this case, if authentication device 220 does not receive an access response within a threshold amount of time, then authentication device 220 may determine to prevent access to the service.

As further shown in FIG. 4, if access to the service has been approved (block 450—YES), then process 400 may include providing an instruction to permit the client device to access the service (block 460). For example, authentication device 220 may determine that access has been approved by the user, as described above. In this case, authentication device 220 may provide an instruction, to service provider device 240, to permit client device 230 to access the service. The instruction may be provided based on the authentication request. For example, the authentication request may identify service provider device 240 (e.g., using a service provider device identifier, such as a network address), and authentication device 220 may provide that instruction to the identified service provider device 240.

The instruction may cause service provider device 240 to permit client device 230 to access the service. For example, the instruction may include a user credential associated with the user request, and service provider device 240 may identify an access request associated with the user credential. Service provider device 240 may permit access associated with the access request. In some implementations, authentication device 220 and/or service provider device 240 may generate a single sign-on (SSO) token to establish a session for providing access to the service by client device 230. In this way, a properly authenticated user may be provided access to the service.

In some implementations, authentication device 220 may provide, to user device 210, an indication that access has been permitted for the service. Additionally, or alternatively, authentication device 220 may provide an option for a user to interact with user device 210 to prevent further access to the service, as described in more detail below in connection with FIG. 6. In this way, if a first user accidentally approves a second user for access to a service (e.g., by interacting with an access notification provided via user device 210), the first user can then prevent the second user from gaining further access to the service, thereby increasing security.

In some implementations, authentication device 220 may store information that indicates that access to the service has been permitted for the user credential. For example, authentication device 220 may store, in a data structure, information that indicates a relationship between a user credential and one or more services for which access has been provided for the user credential. Additionally, or alternatively, authentication device 220 may store information that identifies a client device 230 (e.g., using a client device identifier, such as a network address) for which access to the service has been permitted.

As further shown in FIG. 4, if access to the service has not been approved (block 450—NO), then process 400 may include providing an instruction to prevent the client device from accessing the service (block 470). For example, authentication device 220 may determine that access has not been approved by the user, as described above. In this case, authentication device 220 may provide an instruction, to service provider device 240, to prevent client device 230 from accessing the service. The instruction may be provided based on the authentication request. For example, the authentication request may identify service provider device 240 (e.g., using a service provider device identifier, such as a network address), and authentication device 220 may provide that instruction to the identified service provider device 240.

The instruction may cause service provider device 240 to prevent client device 230 from accessing the service. For example, the instruction may include a user credential associated with the user request, and service provider device 240 may identify an access request associated with the user credential. Service provider device 240 may prevent access associated with the access request. Additionally, or alternatively, authentication device 220 may transmit an email message to an email address associated with a user identified in the authentication request. The email message may indicate that the user's user credential was used to attempt to access a service, and that an access response indicated not to approve access, and/or that no access response was received.

In some implementations, authentication device 220 may provide, to service provider device 240, an instruction to prevent access, associated with the user credential, to a service provided by service provider device 240. Additionally, or alternatively, authentication device 220 may provide, to multiple service provider devices 240, corresponding instructions to prevent access, associated with the user credential, to multiple services corresponding to the multiple service provider devices 240. In this way, if a first user accidentally approves a second user for access to one or more services, the first user can then prevent the second user from gaining further access to the one or more services, thereby increasing security. Further details of preventing further access to a service after permitting initial access to the service are described below in connection with FIG. 6.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show an example of using an access notification to permit or prevent access to a service.

Figure 5A:
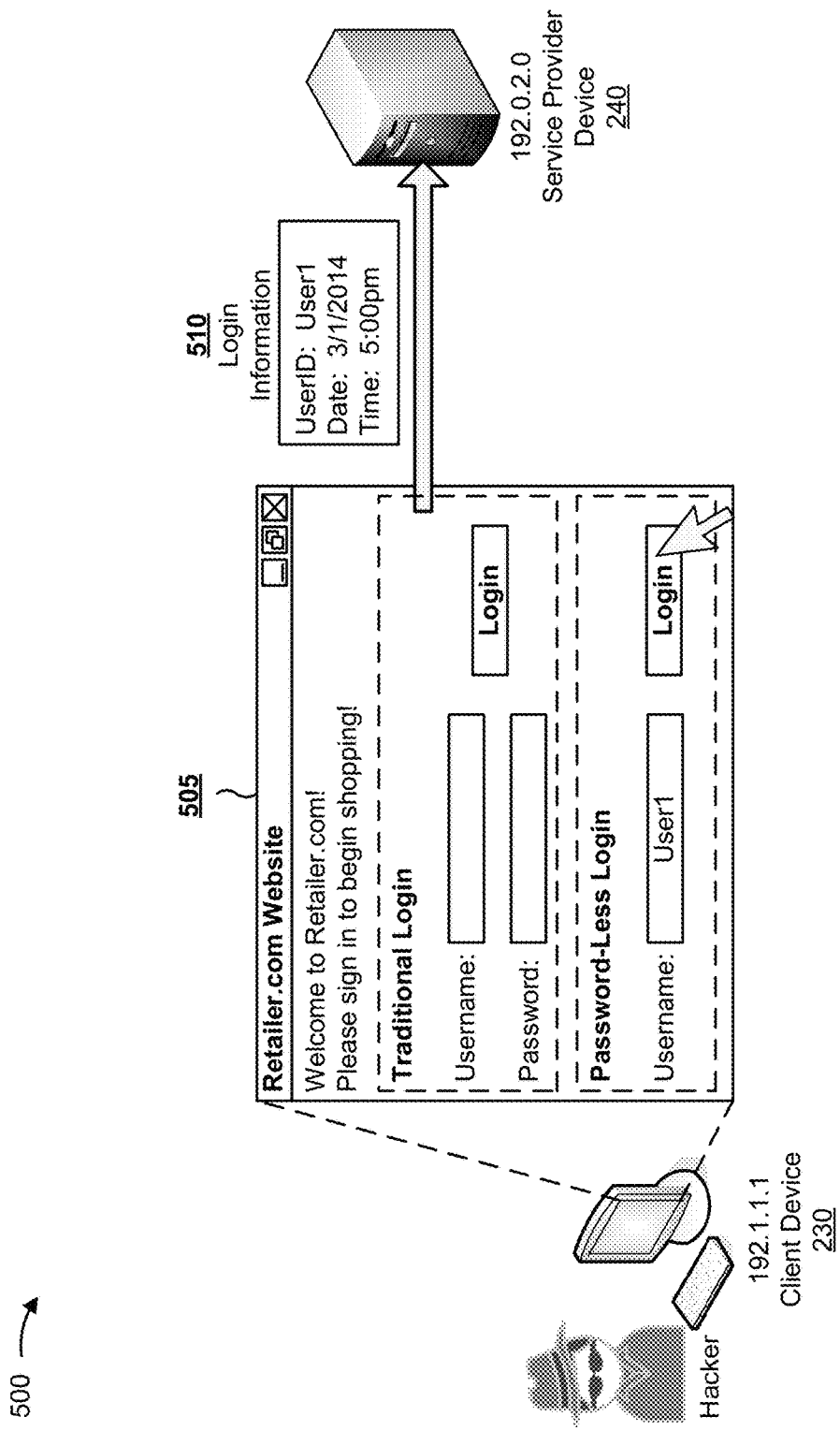
FIGS. 5A-5E are diagrams of an example implementation relating to the example process shown in FIG. 4.

As shown in FIG. 5A, and by reference number 505, assume that a hacker (e.g., a malicious user) navigates to a website of a service provider that has registered for an authentication service. Assume that the service provider, shown as Retailer.com, provides an input mechanism on the website that permits a user (in this case, the hacker) to input a user credential to log in to the website (e.g., using a username and password, a global user credential, etc.). As shown, assume that the hacker inputs the username "User1" (which is not a username of the hacker) and interacts with a login button. As shown by reference number 510, assume that the hacker input is provided using client device 230, associated with a network address of 192.1.1.1, and that client device 230 sends login information to service provider device 240, identified by a network address of 192.0.2.0 (e.g., based on registration information). Assume that the login information identifies the user credential (e.g., User1), a date on which access was requested (e.g., Mar. 1, 2014), and a time at which access was requested (e.g., 5:00 pm).

Figure 5B:
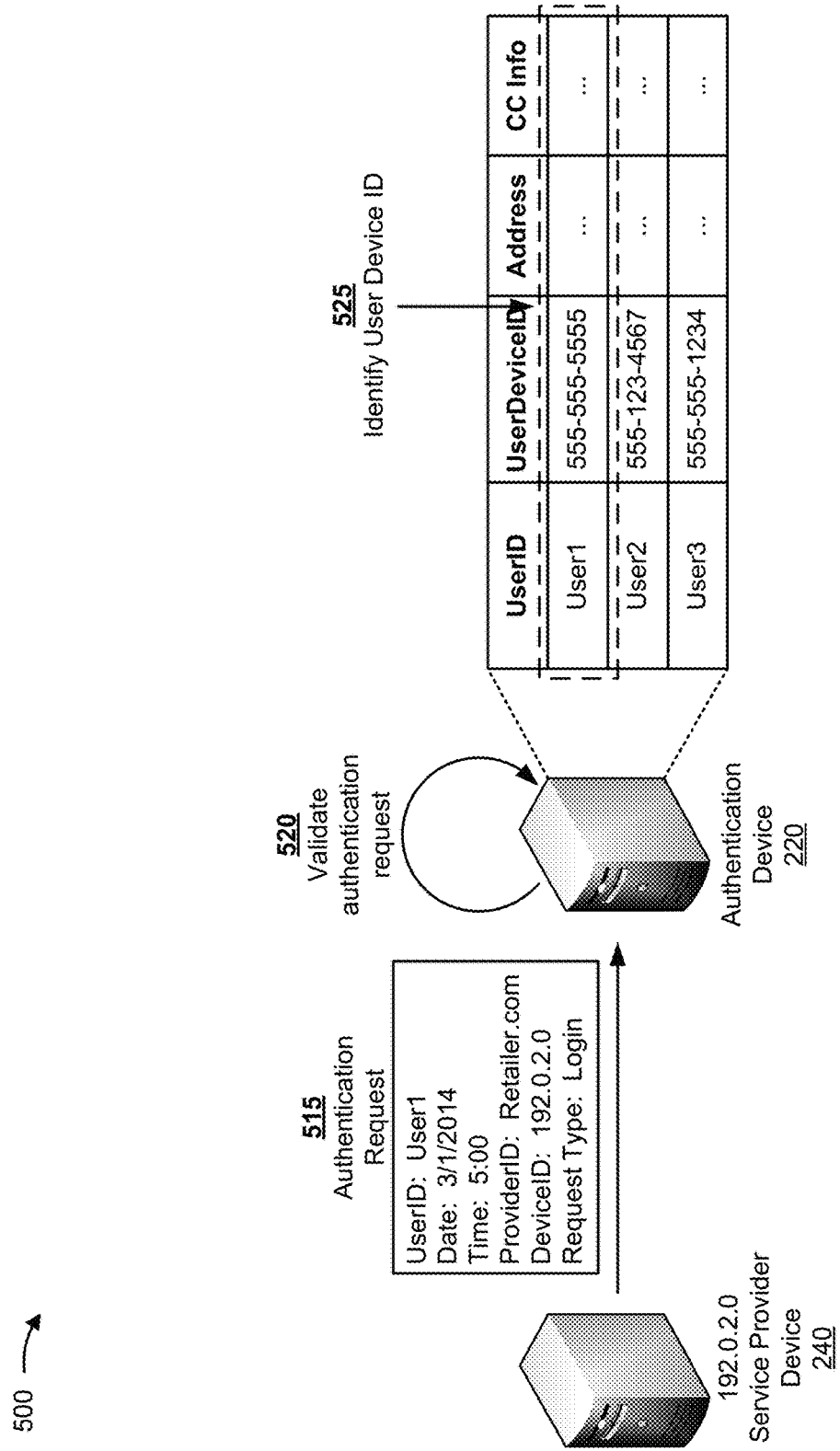

As shown in FIG. 5B, and by reference number 515, assume that service provider device 240 generates an authentication request based on the login information, and provides the authentication request to authentication device 220. Assume that the authentication request includes the login information, a service provider identifier (e.g., Retailer.com), a service provider device identifier (e.g., 192.0.2.0), and an access request type (e.g., a "login" request). As shown by reference number 520, assume that authentication device 220 validates the authentication request, such as by decrypting the authentication request and/or verifying a digital signature included in the authentication request. As shown by reference number 525, assume that authentication device 220 uses the user identifier of User1 to identify, in a data structure stored by authentication device 220 (and/or another device), a user device identifier of 555-555-5555, which corresponds to the User1 user credential.

Figure 5C:
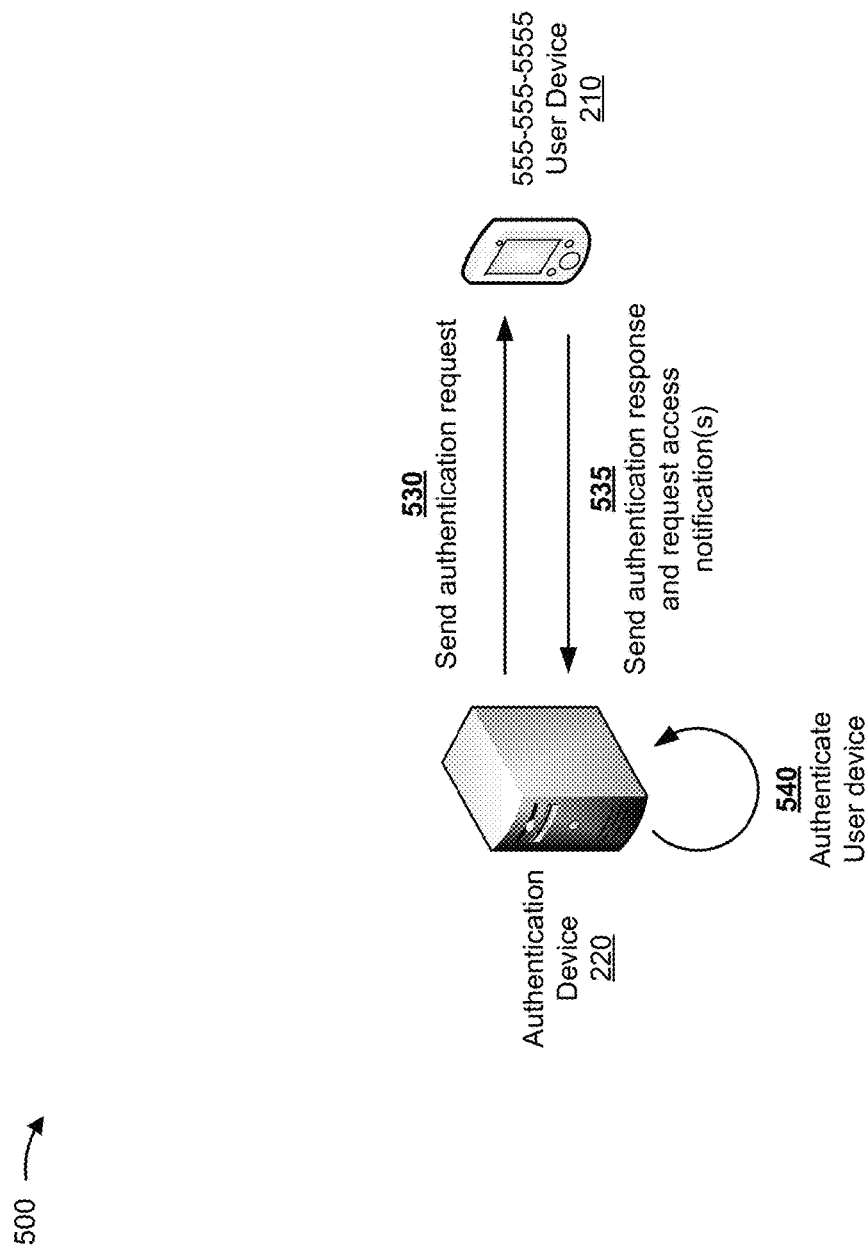

As shown in FIG. 5C, and by reference number 530, assume that authentication device 220 sends an authentication request to user device 210, identified as having the mobile directory number 555-555-5555. Additionally, or alternatively, authentication device 220 may use the user device identifier of 555-555-5555 to activate a security application on user device 210. The security application may handle authentication requests and/or authentication responses. As shown by reference number 535, assume that user device 210 sends an authentication response to authentication device 220, and requests that authentication device 220 send any stored access notifications to user device 210. As shown by reference number 540, assume that authentication device 220 authenticates user device 210 using the authentication response. If authentication device 220 cannot authenticate user device 210, then authentication device 220 may provide an instruction, to service provider device 240, to prevent the hacker claiming to be User1 from logging in to the website. FIG. 5C is provided as an example. In some cases, authentication device 220 may provide an access notification to user device 210 without the authentication described in FIG. 5C.

Figure 5D:
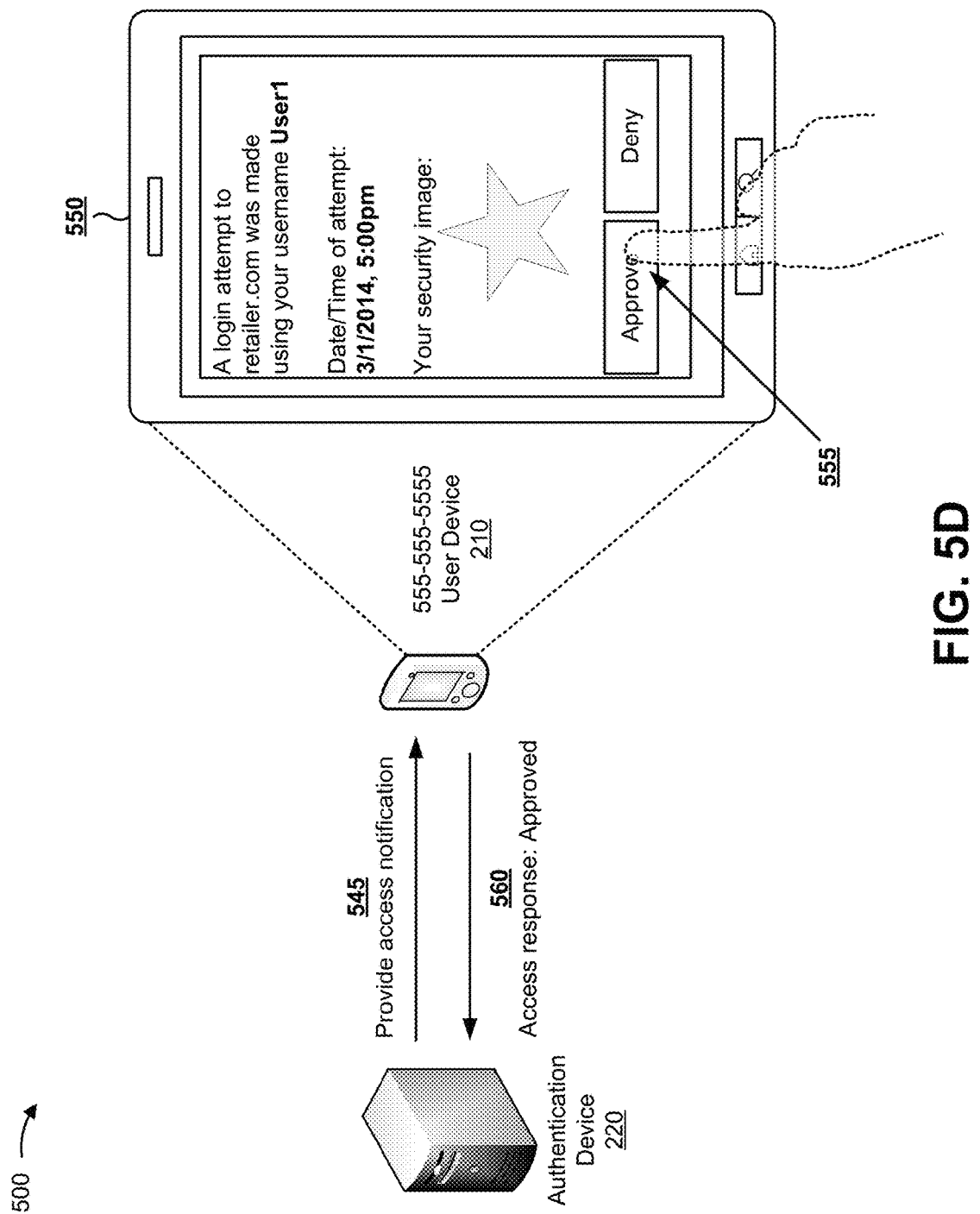

As shown in FIG. 5D, and by reference number 545, authentication device 220 may provide an access notification, associated with the login attempt by User1, to user device 210 (e.g., which is associated with the user credential "User1"). As shown by reference number 550, user device 210 may provide the access notification for display (e.g., using a security application, in some cases). As shown, the access notification may indicate that a login attempt to retailer.com was made using the username User1 on Mar. 1, 2014 at 5:00 pm. Further, the access notification may include a security image previously specified by the user. Finally, the access notification may include input mechanisms that permit the user to interact with user device 210 to cause access to the service to be approved (e.g., permitted) or denied (e.g., prevented).

As shown by reference number 555, assume that the user selects to approve access to the service. As shown by reference number 560, based on the user selection, user device 210 provides an access response, to authentication device 220, indicating that access has been approved. In this case, assume that the user accidentally approved access for the hacker, and later wants to deny further access to the hacker, as described in more detail below.

Figure 5E:
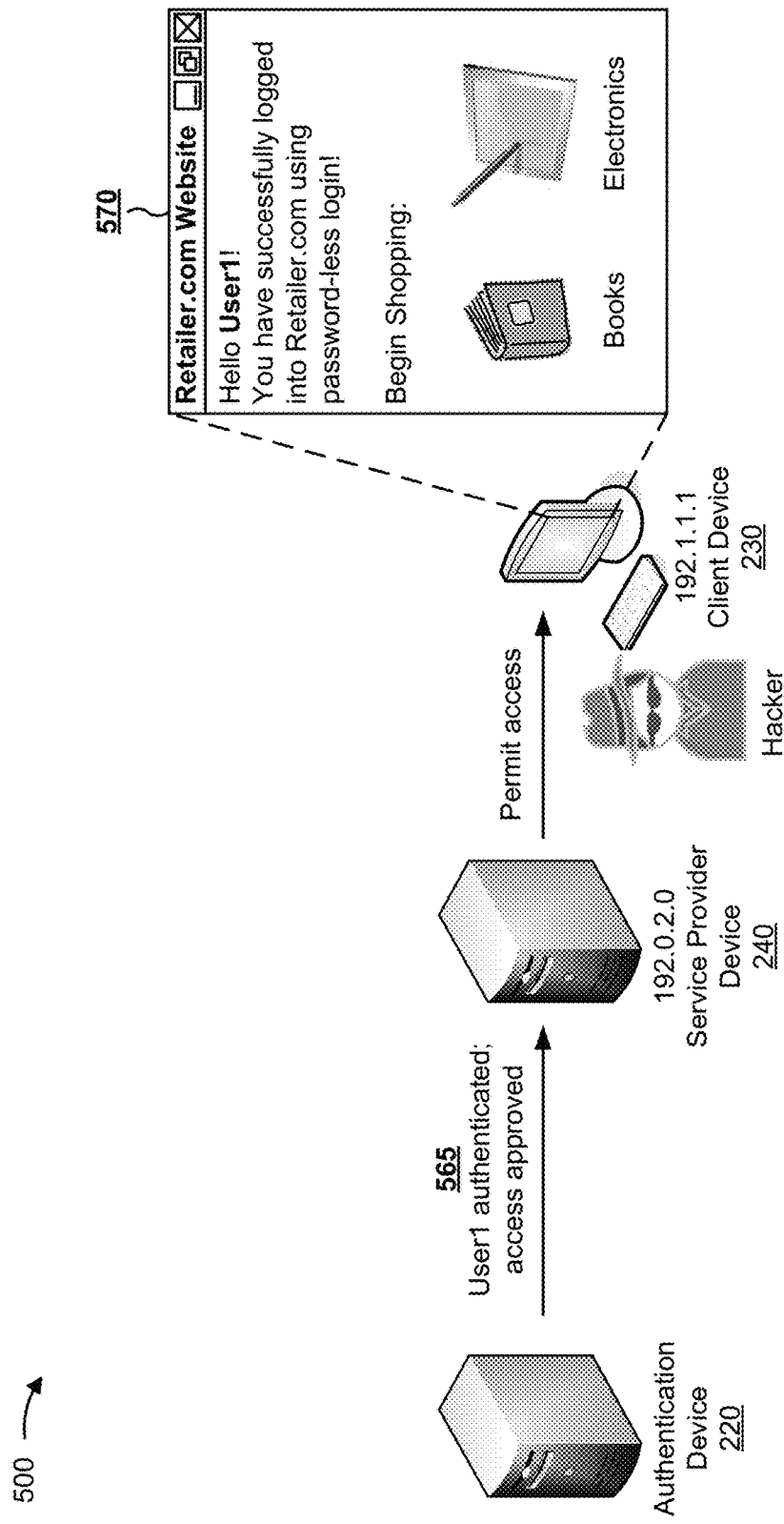

As shown in FIG. 5E, and by reference number 565, based on receiving the access response, authentication device 220 provides an indication, to service provider device 240, that User1 has been authenticated and that access has been approved. Based on receiving the indication (e.g., an instruction to permit access), assume that service provider device 240 permits User1 to log in to the Retailer.com website via client device 230, as shown by reference number 570. In this case, a hacker is using client device 230, and has gained access to User1's account, which the user accidentally approved using user device 210. The user may want to deny further access to the hacker, and may do so as described in more detail below. In this way, authentication device 220 may increase security by permitting a user to prevent further access after initially permitting access to a service.

As indicated above, FIGS. 5A-5E are provided merely as an example. Other examples are possible and may differ from what was described with regard to FIGS. 5A-5E.

Figure 6:
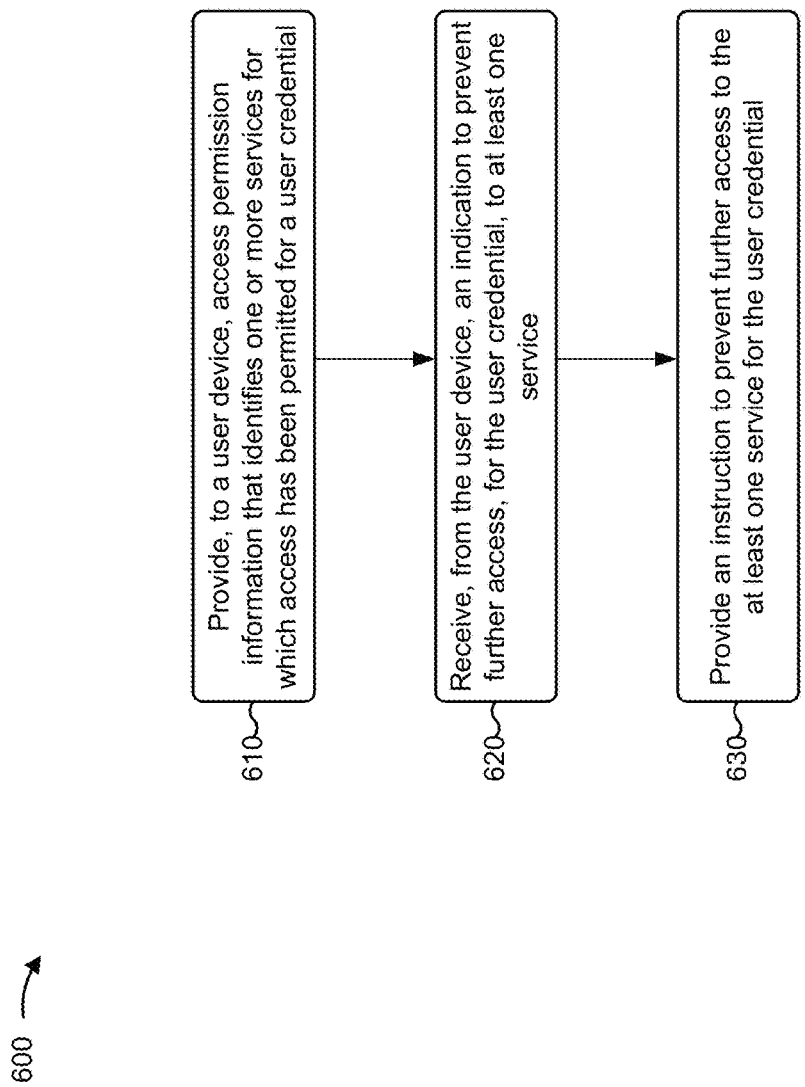
FIG. 6 is a flow chart of an example process for preventing further access to a service after initial access to the service has been permitted.

FIG. 6 is a flow chart of an example process 600 for preventing further access to a service after initial access to the service has been permitted. In some implementations, one or more process blocks of FIG. 6 may be performed by authentication device 220. In some implementations, one or more process blocks of FIG. 6 may be performed by another device or a group of devices separate from or including authentication device 220, such as user device 210, client device 230, and/or service provider device 240.

As shown in FIG. 6, process 600 may include providing, to a user device, access permission information that identifies one or more services for which access has been permitted for a user credential (block 610). For example, authentication device 220 may provide access permission information to user device 210. The access permission information may identify one or more services for which access has been permitted in association with a user credential. Additionally, or alternatively, the access permission may identify one or more client devices 230 for which access has been permitted to the one or more services, one or more locations for which access has been permitted, or the like. In some implementations, authentication device 220 may provide the information based on a request from user device 210. For example, a user of user device 210 may interact with a security application to request the access permission information. Additionally, or alternatively, a user may interact with user device 210 to approve access to a service (e.g., as described above in connection with FIG. 4), and authentication device 220 may provide the access permission information based on receiving an indication to approve access to the service.

In some implementations, authentication device 220 may identify one or more services associated with a user credential. For example, a user may use a security application to request the access permission information, and may be logged into the security application using a user credential. In some implementations, authentication device 220 may receive the user credential from user device 210 (e.g., in association with receiving the request for the access permission information). Additionally, or alternatively, user device 210 may be associated with a user device identifier (e.g., an MDN, an IMSI, etc.). In some implementations, authentication device 220 may receive the user device identifier, and may use the user device identifier to identify the user credential (e.g., by searching a data structure). In some implementations, the user device identifier may be the user credential.

In some implementations, the user credential may be a global user credential used to access multiple services (e.g., a single global user credential used to access multiple services). Authentication device 220 may store information that identifies services for which the global user credential has been permitted access (e.g., based on receiving an access response indicating to approve access for the global user credential, as described above in connection with FIG. 4). Additionally, or alternatively, authentication device 220 may identify multiple user credentials used to access multiple services. For example, authentication device 220 may receive a particular user credential (e.g., associated with a security application), and may identify (e.g., based on stored information) multiple user credentials associated with the particular user credential. As another example, authentication device 220 may determine a user device identifier associated with user device 210, and may identify (e.g., based on stored information) multiple user credentials associated with the user device identifier. Authentication device 220 may use the multiple user credentials to identify one or more services for which access has been permitted for the multiple user credentials.

In some implementations, the access permission information may identify a single service for which access has been permitted. In some implementations, the access permission information may identify all services for which access has been permitted. In some implementations, the access permission information may identify a subset of services for which access has been permitted. For example, the access permission information may identify services having one or more service types, may identify services for which one or more client devices 230 have been permitted access, may identify services for which one or more user credentials have been permitted access, may identify services associated with one or more service providers, or the like.

Authentication device 220 may provide access permission information to user device 210, and user device 210 may provide the access permission information for display. For example, user device 210 may provide, for display, information that identifies one or more services for which access has been permitted. Additionally, or alternatively, user device 210 may provide an input mechanism that permits a user to interact with user device 210 to identify at least one service for which further access is to be prevented, as described below. In this way, a user may prevent further access to a service after initial access has been permitted, thereby improving security.

As further shown in FIG. 6, process 600 may include receiving, from the user device, an indication to prevent further access, for the user credential, to at least one service (block 620). For example, authentication device 220 may receive, from user device 210, an indication to prevent further access, associated with a user credential, to at least one service (e.g., of the one or more services described above in connection with block 610). In some implementations, a user may interact with user device 210 to identify at least one service for which further access is to be prevented. For example, a user may interact with user device 210 to prevent further access to a single service for which access has been permitted for a user credential, to all services for which access has been permitted for the user credential, to a subset of services for which access has been permitted for the user credential (e.g., a subset of services selected by the user), or the like.

Authentication device 220 may receive the indication to prevent further access to a service after permitting initial access to the service. For example, authentication device 220 may permit initial access to a service based on providing an access notification, associated with the service, to user device 210, and receiving an access response, from user device 210, that indicates that access to the service is to be permitted. In some cases, a user may have accidentally approved access to the service, and may interact with user device 210 to prevent further access to the service.

In this way, if a hacker gains access to a service provided by service provider device 240, authentication device 220 may instruct service provider device 240 to prevent further access. For example, the hacker may access a website hosted by service provider device 240. Later, service provider device 240 may receive the instruction to prevent further access. Based on the instruction, service provider device 240 may log the hacker out of the website, may redirect the hacker to a logout page, may prevent the hacker from accessing additional web pages associated with the website, or the like. In this way, security of the service may be improved.

As further shown in FIG. 6, process 600 may include providing an instruction to prevent further access to the at least one service for the user credential (block 630). For example, authentication device 220 may provide, to service provider device 240, an instruction to prevent further access to a service for the user credential. Authentication device 220 may provide the instruction based on receiving, from user device 210, an indication to prevent further access to the service. In some implementations, authentication device 220 may store information that identifies a relationship between a service identifier, that identifies a service, and a service provider device identifier that identifies a service provider device 240 that provides the service. In this way, authentication device 220 may use the service identifier (e.g., received from user device 210 in association with the indication to prevent further access to the service) to identify a service provider device 240 to which to provide the instruction. In some implementations, authentication device 220 may store the information that identifies the relationship based on registration information that registers a service and a service provider for an authentication service provided by authentication device 220.

In some cases, such as when multiple service provider devices 240 provide a single service, or when there are multiple services, associated with multiple service provider devices 240, for which further access is to be prevented, then authentication device 220 may identify multiple service provider devices 240 to which to send an instruction to prevent further access. Authentication device 220 may provide the instruction to the multiple service provider devices 240.

In some implementations, the instruction may include the user credential for which further access is to be prevented. Additionally, or alternatively, service provider device 240 may use the user credential to identify a session and/or a client device 230 for which further access is to be prevented. Service provider device 240 may prevent further access to the service by, for example, terminating the session, preventing client device 230 from accessing the service (e.g., by logging out client device 230), or the like.

In some implementations, the instruction may indicate that further access is to be prevented for an active session associated with the user credential. In this case, service provider device 240 may prevent further access via the active session associated with the user credential (e.g., but may establish a future session associated with the user credential and/or client device 230 associated with the active session).

Additionally, or alternatively, the instruction may indicate that further access is to be prevented for a client device 230 associated with an active session (e.g., that the client device 230 is to be blocked from further access). In this case, service provider device 240 may prevent further access to the service, using the user credential, by client device 230. Additionally, or alternatively, service provider device 240 may prevent access to a service, using any user credential, by client device 230 because client device 230 may be associated with a malicious user.

Additionally, or alternatively, the instruction may indicate that further access is to be prevented for the user credential. In this case, service provider device 240 may prevent further access to the service, from any client device 230, using the user credential. In other words, service provider device 240 may lock a user account associated with the user credential. In some implementations, service provider device 240 may lock the user account until additional verification, associated with the user account owner (e.g., a user), is received. In some implementations, service provider device 240 may require verification before locking out an account so that a malicious user cannot lock an account of a legitimate user.

In this way, authentication device 220 and service provider device 240 may assist in preventing malicious users from performing malicious actions, such as obtaining sensitive personal information, making illegitimate purchases, removing money from an account, or the like.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
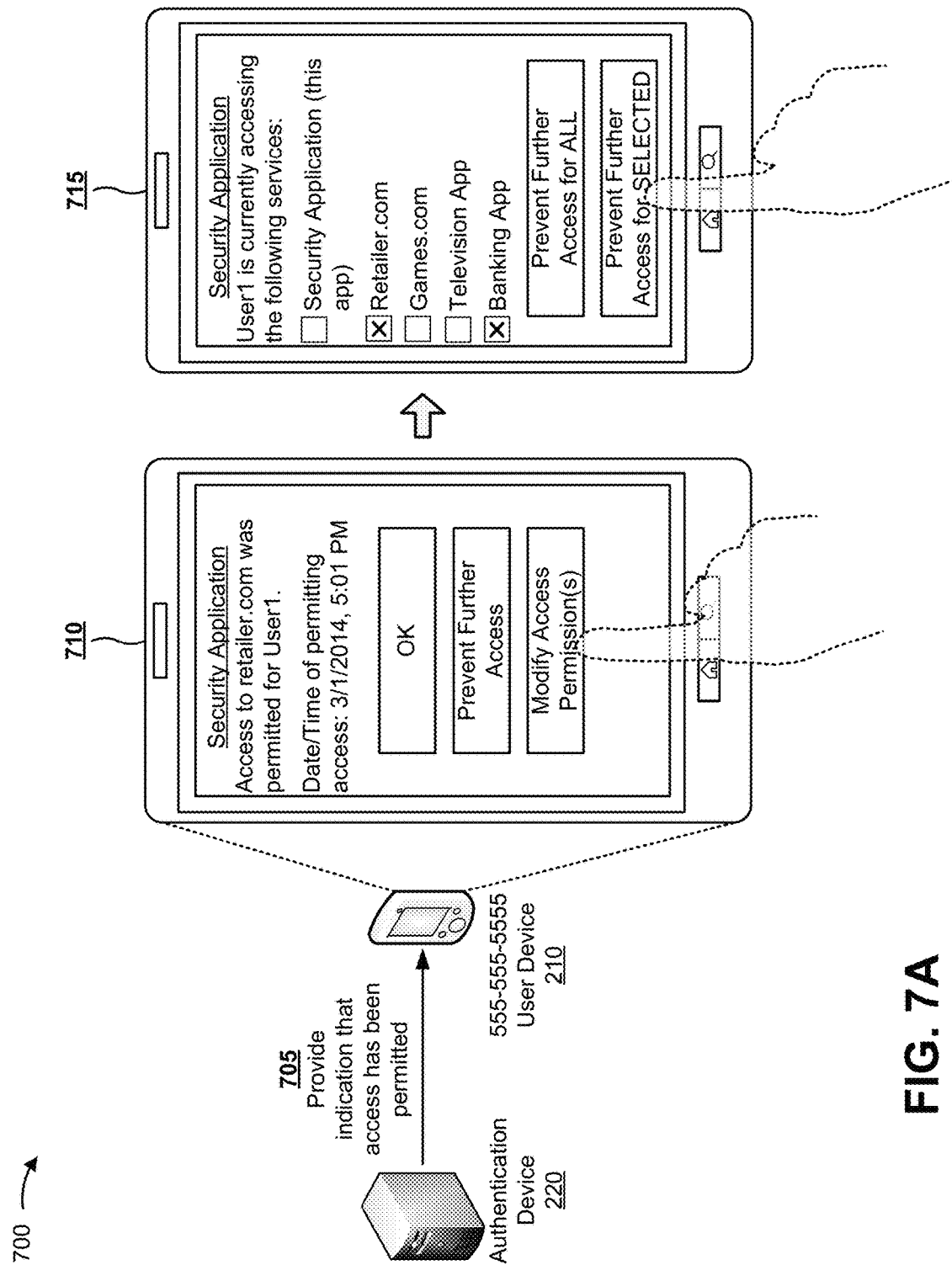
FIGS. 7A-7C are diagrams of an example implementation relating to the example process shown in FIG. 6.
Figure 7B:
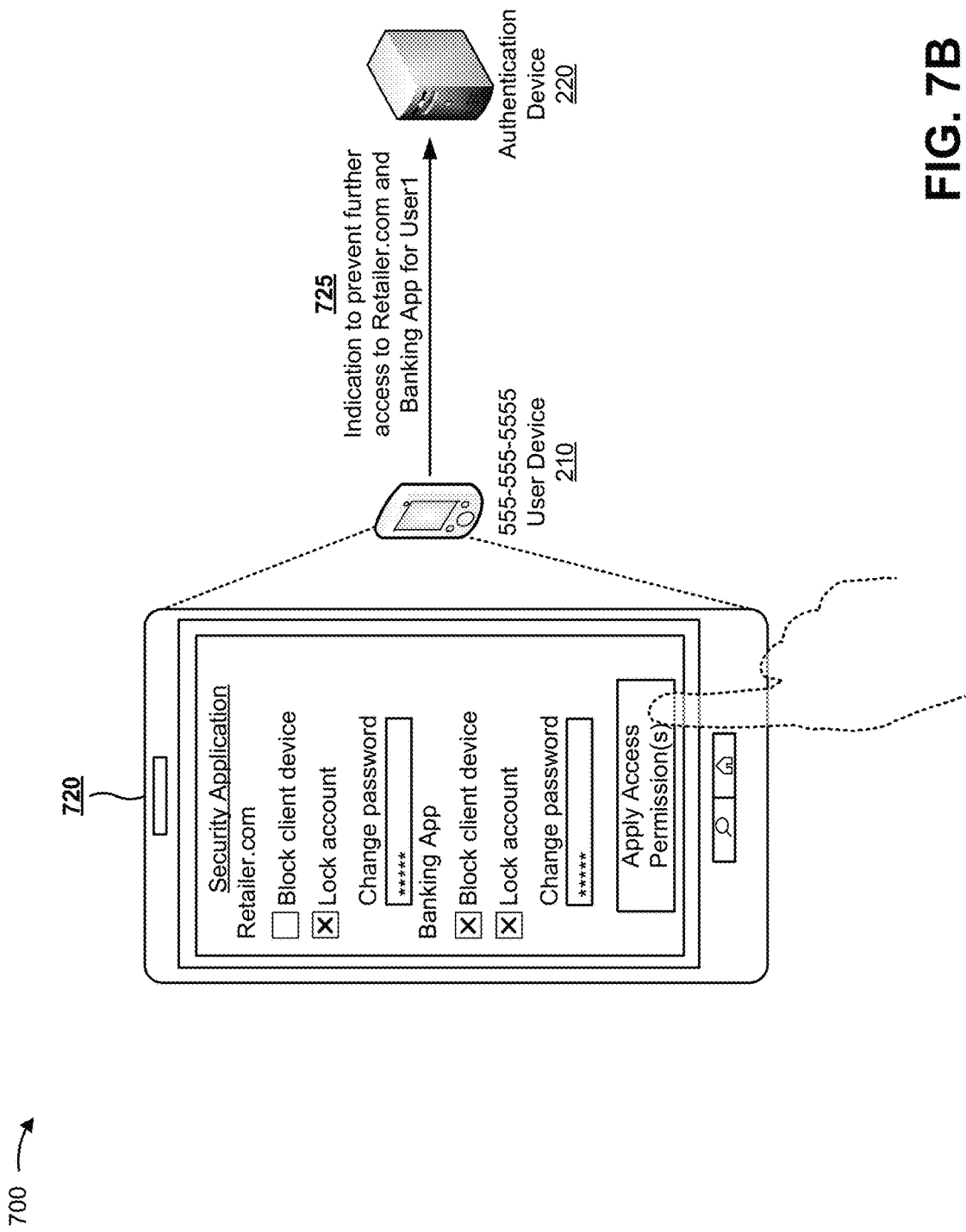
Figure 7C:
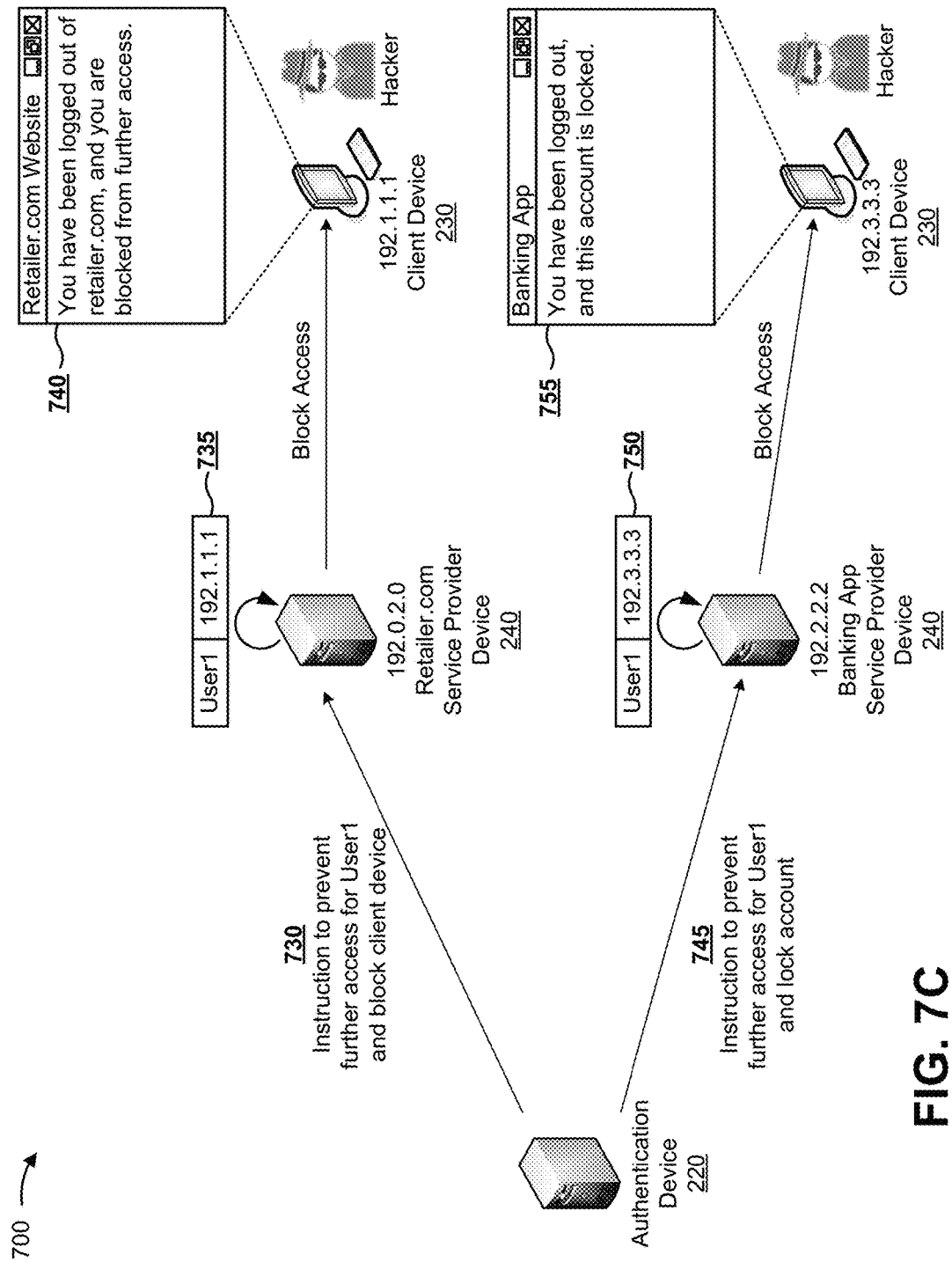

FIGS. 7A-7C are diagrams of an example implementation 700 relating to example process 600 shown in FIG. 6. FIGS. 7A-7C show an example of preventing further access to a service after initial access to the service has been permitted. For the purpose of FIGS. 7A-7C, assume that the operations described herein in connection with FIGS. 5A-5E have been performed. In other words, assume that a user has accidentally approved access to a retailer.com website for a hacker that has stolen the user's user credential. Further, assume that the user has also approved access, for the hacker using the user credential, to a banking application. Finally, assume that the user credential has been legitimately used (e.g., by the user) to access a security application, a games.com website, and a television application.

As shown in FIG. 7A, and by reference number 705, authentication device 220 may provide an indication that access to retailer.com has been permitted. For example, authentication device 220 may provide the indication based on permitting access to retailer.com, as described in connection with FIG. 5E. As further shown, authentication device 220 may provide the indication to user device 210 associated with an MDN of 555-555-5555 (e.g., the same user device 210 that received the access notification and sent the access response to approve access, as described above in connection with FIG. 5D).

As shown by reference number 710, the indication may be provided for display via user device 210 to indicate that access to retailer.com was permitted for User1 (e.g., a user credential for which access was approved). For example, the indication may be provided for display via a security application executing on user device 210. Additionally, or alternatively, the security application may provide input mechanisms to confirm access (e.g., "OK"), to prevent further access to retailer.com for the user credential (e.g., "Prevent Further Access"), to modify access permissions for one or more services for which access has been permitted (e.g., "Modify Access Permission(s)"), or the like. As shown, assume that the user interacts with an input mechanism to modify access permissions.

As shown by reference number 715, based on the user interaction, the security application may provide, for display, information that identifies services for which access has been permitted for the user credential (e.g., "User1"). In some implementations, user device 210 may receive this information from authentication device 220. For example, based on the user interaction, user device 210 may request and receive, from authentication device 220, the information that identifies the services. As shown, assume that the user credential of User1 has been permitted access to the security application (e.g., the security application executing on user device 210, which the user logged into using the user credential of Used), the retailer.com website, the games.com website, the television application, and the banking application.

As shown, the security application may provide input mechanisms to permit the user to prevent further access for all services, to prevent further access for selected services, or the like. As shown, assume that the user selects to prevent further access to the retailer.com website and the banking application, as the user had accidentally approved access for the hacker to access these services using the user credential.

As shown in FIG. 7B, and by reference number 720, based on the user interaction, assume that the security application provides, for display, options for preventing further access to the selected services. For example, the security application may provide input mechanisms for the user to block the client device 230 that was permitted to access the service using the user credential, to lock an account associated with service and the user credential, to change a password associated with the user credential and the service, or the like. As shown, assume that the user selects to block client devices 230 that was permitted to access the retailer.com website using the user credential, and selects to block client devices 230 and lock an account associated with the user credential for the banking application. As shown by reference number 725, based on the user interaction, user device 210 provides, to authentication device 220, an indication to prevent further access to the retailer.com website and the banking application for the user credential of User1, based on the options selected by the user.

As shown in FIG. 7C, and by reference number 730, based on the user-selected options, authentication device 220 provides an instruction to service provider device 240 associated with the retailer.com website. For example, authentication device 220 may identify service provider device 240 with a network address of 192.0.2.0 based on stored registration information that links the retailer.com website with the network address. As shown, the instruction may be an instruction to prevent further access to the retailer.com website for the client device 230 accessing the retailer.com website using the user credential of User1. As shown by reference number 735, service provider device 240 may identify a session and/or a client device 230 associated with the user credential, shown as a client device 230 with a network address of 192.1.1.1. As shown by reference number 740, service provider device 240 may block access to the retailer.com website for client device 230. In this way, techniques described herein may increase security by preventing hackers from obtaining sensitive information or performing malicious actions using stolen user credentials.

As further shown in FIG. 7C, and by reference number 745, based on the user-selected options, authentication device 220 provides an instruction to service provider device 240 associated with the banking application. For example, authentication device 220 may identify service provider device 240 with a network address of 192.2.2.2 based on stored registration information that links the banking application with the network address. As shown, the instruction may be an instruction to prevent further access to the banking application for client device 230, and to lock a user account associated with the user credential of User1. As shown by reference number 750, service provider device 240 may identify a session and/or a client device 230 associated with the user credential, shown as a client device 230 with a network address of 192.3.3.3. As shown by reference number 755, service provider device 240 may block access to the banking application for client device 230, and may lock the user account associated with User1 (e.g., until the user indicates to unlock the account). In this way, techniques described herein may increase security by preventing hackers from obtaining sensitive information or performing malicious actions using stolen user credentials.

As indicated above, FIGS. 7A-7C are provided merely as an example. Other examples are possible and may differ from what was described with regard to FIGS. 7A-7C.

Implementations described herein provide techniques for preventing further access to a service after initial access to the service has been permitted, thereby increasing security.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
      receive information associated with a user request to access a service using a first device,
         the information associated with the user request including a user credential;
      identify a second device associated with the user credential,
         the second device being different from the first device;
      provide a first notification, associated with the user request to access the service, to the second device;
      receive a response from the second device based on providing the first notification, the response indicating to permit access to the service;
provide a first instruction to permit the first device to access the service based on the response;
provide a second notification to the second device including information that identifies one or more services for which access has been permitted for the user credential,
the one or more services including the service;
receive an indication to terminate an active session associated with the user credential and at least one service, of the one or more services, based on providing the second notification to the second device; and
provide a second instruction to terminate the active session based on receiving the indication to terminate the active session.

2. The device of claim 1, where the one or more services include a plurality of services; and
where the user credential is a global user credential used to access the plurality of services.

3. The device of claim 1, where the one or more services include:
a first service for which access has been permitted for the user credential; and
a second service for which access has been permitted for another user credential associated with the user credential.

4. The device of claim 1, where the one or more processors, when receiving the information associated with the user request, are to:
receive the information associated with the user request from a service provider device associated with a service provider that provides the service;
where the one or more processors, when providing the first instruction to permit the first device to access the service, are to:
provide the first instruction, to permit the first device to access the service, to the service provider device; and
where the one or more processors, when providing the second instruction to terminate the active session, are to:
provide the second instruction, to terminate the active session, to the service provider device.

5. The device of claim 1, where the one or more processors, when providing the information that identifies the one or more services, are to:
provide the information, that identifies the one or more services, to the second device; and
where the one or more processors, when receiving the indication to terminate the active session, are to:
receive the indication, to terminate the active session, from the second device.

6. A non-transitory computer-readable medium storing instructions, the instructions comprising:
one or more instructions that, when executed by one or more processors, cause the one or more processors to:
receive information associated with a request to access a service using a first device,
the information identifying a user credential for accessing the service;
identify a second device associated with the user credential,
the second device being different from the first device;
provide a first notification, associated with the request to access the service, to the second device;
receive a response from the second device based on providing the first notification,
the response indicating to permit access to the service;
provide, based on the response, a first instruction to permit the first device to access the service using the user credential;
provide a second notification to the second device including information that identifies one or more services for which access has been permitted for one or more user credentials,
the one or more services including the service,
the one or more user credentials including the user credential;
receive an indication to terminate an active session associated with the service and the user credential based on providing the second notification to the second device; and
provide a second instruction to terminate the active session based on receiving the indication to terminate the active session.

7. The non-transitory computer-readable medium of claim 6, where the one or more services include a plurality of services; and
where the one or more user credentials and the user credential are a single global user credential used to access the plurality of services.

8. The non-transitory computer-readable medium of claim 6, where the one or more services include a plurality of services; and
where the one or more user credentials include a plurality of user credentials corresponding to the plurality of services.

9. The non-transitory computer-readable medium of claim 8, where the one or more instructions, when executed by the one or more processors, further cause the one or more processors to:
receive at least one of:
a device identifier that identifies the second device, or
the user credential;
identify the plurality of user credentials based on at least one of the device identifier or the user credential;
identify the plurality of services based on the plurality of user credentials; and
where the one or more instructions, that cause the one or more processors to provide the information that identifies the one or more services, cause the one or more processors to:
provide information that identifies the plurality of services based on identifying the plurality of services.

10. The non-transitory computer-readable medium of claim 6, where the one or more instructions, when executed by the one or more processors, further cause the one or more processors to:
receive a device identifier that identifies the second device;
identify the one or more user credentials based on the device identifier;
identify the one or more services based on the one or more user credentials; and
where the one or more instructions, that cause the one or more processors to provide the information that identifies the one or more services, cause the one or more processors to:
provide the information that identifies the one or more services based on identifying the one or more services.

11. The non-transitory computer-readable medium of claim 10, where the user credential is the device identifier.

12. The non-transitory computer-readable medium of claim 6, where the one or more instructions, when executed by the one or more processors, further cause the one or more processors to:
identify a service provider device, associated with a service provider that provides the service, based on stored information that identifies a relationship between the service provider device and the service; and
where the one or more instructions, that cause the one or more processors to provide the second instruction to terminate the active session, cause the one or more processors to:
provide the second instruction to the service provider device based on identifying the service provider device.

13. A method, comprising:
receiving, by a device, information associated with a request to access a service using a first device,
the information associated with the request including a user credential for accessing the service;
identifying, by the device, a second device associated with the user credential,
the second device being different from the first device;
providing, by the device and to the second device, a first notification associated with the request to access the service;
receiving, by the device, a response from the second device based on providing the first notification,
the response indicating to permit access to the service;
providing, by the device and based on the response, a first instruction to permit the first device to access the service using the user credential;
providing, by the device and after providing the first instruction, a second notification to the second device including information that identifies one or more services for which access has been permitted for the user credential,
the one or more services including the service;
receiving, by the device, an indication to terminate an active session associated with the user credential and the service based on providing the second notification to the second device; and
providing, by the device, a second instruction to terminate the active session based on receiving the indication to terminate the active session.

14. The method of claim 13, where the one or more services include a plurality of services.

15. The method of claim 13, further comprising:
receiving an indication to prevent further access to another service, of the one or more services, for the user credential based on providing the information that identifies the one or more services; and
providing a third instruction to prevent further access to the other service for the user credential based on receiving the indication to prevent further access to the other service for the user credential.

16. The method of claim 13, where receiving the indication to terminate the active session comprises:
receiving an indication to terminate the active session with the first device; and
where providing the second instruction to terminate the active session comprises:
providing an instruction to terminate the active session with the first device based on receiving the indication to terminate the active session with the first device.

17. The method of claim 13, where receiving the indication to terminate the active session comprises:
receiving an indication to lock a user account associated with the user credential and the service; and
where providing the second instruction to terminate the active session comprises:
providing an instruction to lock the user account based on receiving the indication to lock the user account.

18. The method of claim 14, where the user credential is a global user credential used to access the plurality of services.

19. The method of claim 14, where the user credential includes a plurality of user credentials corresponding to the plurality of services.

20. The method of claim 13, where the one or more services include:
a first service for which access has been permitted for the user credential; and
a second service for which access has been permitted for another user credential associated with the user credential.

* * * * *